United States Patent [19]
Asano et al.

[11] Patent Number: 4,739,465
[45] Date of Patent: Apr. 19, 1988

[54] LOW LOSS AND ANTI-SHOOT-THROUGH PULSE WIDTH MODULATED INVERTER CONTROLLER

[75] Inventors: Katsuhiro Asano; Yukio Inagawa, both of Nagoya, Japan

[73] Assignee: Kabushiki Kaisha Toyota Chuo Kenkyusho, Aichi, Japan

[21] Appl. No.: 884,366

[22] Filed: Jul. 11, 1986

[30] Foreign Application Priority Data

Jul. 16, 1985 [JP] Japan ................. 60-156654

[51] Int. Cl.4 ........................... H02H 7/122
[52] U.S. Cl. ........................ 363/56; 363/41; 363/57; 363/97; 363/133
[58] Field of Search ............ 363/26, 41, 56, 57, 363/96, 97, 133

[56] References Cited

U.S. PATENT DOCUMENTS

| | | | |
|---|---|---|---|
| 3,710,229 | 1/1973 | Jessee | 363/41 |
| 4,325,113 | 4/1982 | Tomlie | 363/97 |
| 4,342,076 | 7/1982 | Rosswurm et al. | 363/56 |
| 4,344,124 | 8/1982 | Panicali | 363/97 |
| 4,371,824 | 2/1983 | Gritter | 363/56 |
| 4,456,949 | 6/1984 | Incledon | 363/56 |
| 4,600,984 | 7/1986 | Cohen | 363/97 |
| 4,633,381 | 12/1986 | Upadhyay | 363/56 |

Primary Examiner—Patrick R. Salce
Assistant Examiner—Jeffrey Sterrett
Attorney, Agent, or Firm—Parkhurst & Oliff

[57] ABSTRACT

An inverter controller for controlling an inverter having a plurality of electric valves each formed by connecting a switching element and a diode in anti-parallel with each other. On the basis of an output current command value, an ON/OFF signal is supplied to a switching element which needs to operate, and the supply of an ON signal to a switching element which need not operate is inhibited. Thus, it becomes unnecessary to provide dead time which has heretofore been needed.

25 Claims, 13 Drawing Sheets

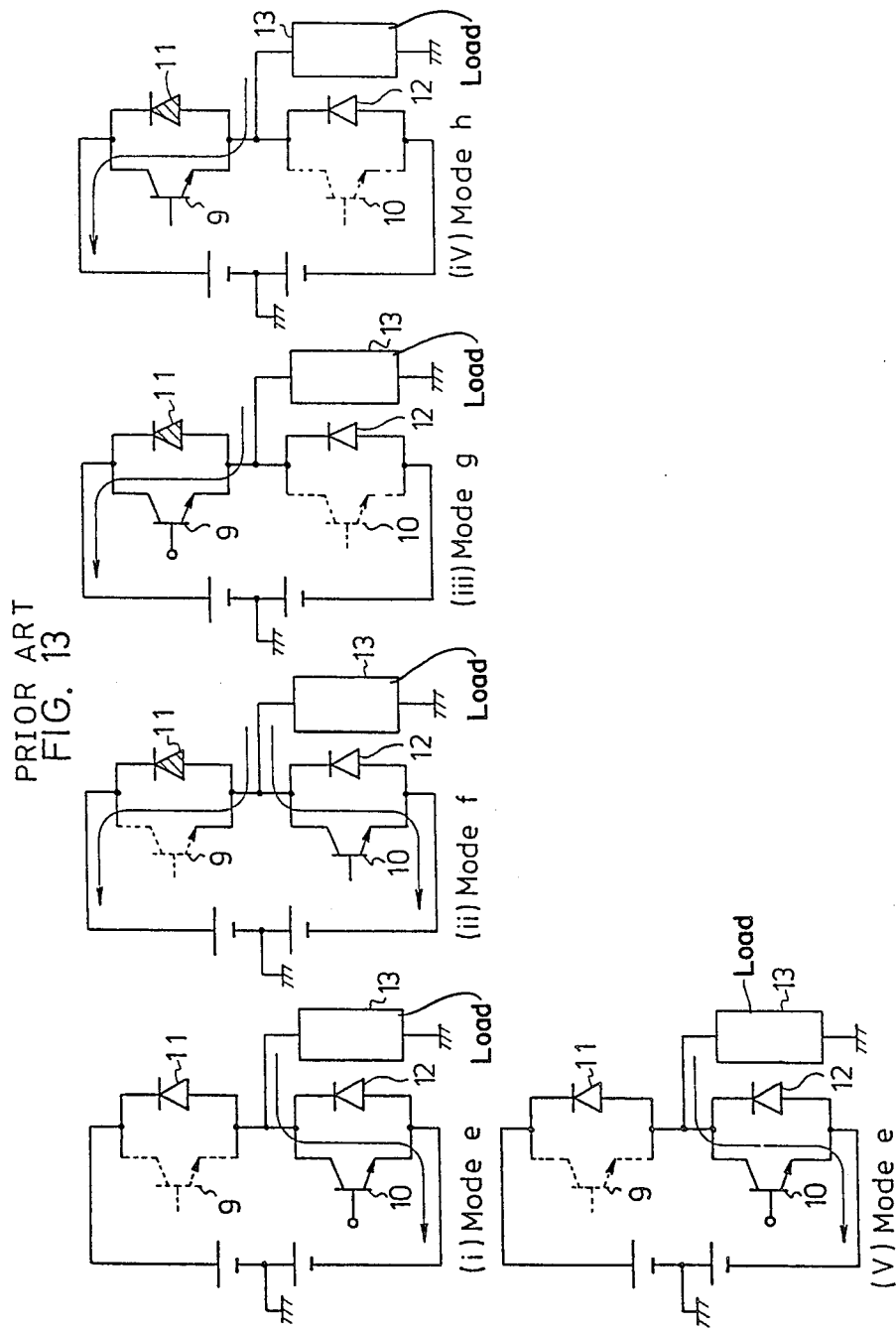

LOW LOSS AND ANTI-SHOOT-THROUGH PULSE WIDTH MODULATED INVERTER CONTROLLER

BACKGROUND OF THE INVENTION

1. Field of the Invention

The present invention relates to an inverter controller for controlling a pulse-width modulated inverter. More particularly, the present invention pertains to a controller for controlling inverter switching elements which involves no fear of a short across the power supply during the commutation of a voltage-controlled inverter having a relatively small impedance when viewing the power supply side from the load, and which enables the control accuracy and response to be improved.

2. Description of the Related Art

In pulse-width modulated inverter controllers, an ON signal which is supplied to semiconductor switching elements is generally provided with a dead time of several tens of $\mu$sec for the purpose of preventing the occurrence of a short across the power supply during the commutation.

This type of conventional inverter controller will be explained below with reference to FIGS. 10 to 13. FIG. 10 shows the circuit configuration of a conventional inverter controller, in which a single-phase inverter is exemplarily illustrated for simplification of the explanation.

An inverter 1 is constituted by semiconductor switching elements. More specifically, the inverter 1 is formed by series-connecting an anti-parallel circuit of a transistor 9 and a diode 11 and another anti-parallel circuit of a transistor 10 and a diode 12, these anti-parallel circuits being respectively connected to the positive side of a DC power supply 15 and the negative side of a DC power supply 16. One end of a single-phase load 13 is connected to the node of series connection between the transistor 9 and the transistor 10 which defines the output terminal of the inverter 1. The other end of the load 13 is grounded through a current detector 14. The node of series connection between the DC power supplies 15 and 16 is similarly grounded.

A current control amplifier 18 is supplied with, as inputs, an output current command value output from an output current command value calculating section 17 and a detected output current value output from the current detector 14, so as to calculate and output an output potential command for the inverter 1.

A delay circuit 4 is supplied with, as an input, the output potential command from the current control amplifier 18 and outputs a signal obtained by delaying the output potential command.

An AND circuit 6 is supplied with, as inputs, the output potential command and the delayed output potential command. The AND circuit 6 ANDs these signals to form an ON/OFF signal for the transistor 9. Another delay circuit 5 is supplied with the output potential command which is output from the current control amplifier 18 and inverted by a NOT circuit 3. The delay circuit 5 delays this inverted output potential command and outputs the delayed command to an AND circuit 7.

The AND circuit 7 is supplied with, as inputs, the inverted output potential command output from the NOT circuit 3 and the signal obtained by delaying the inverted output potential command through the delay circuit 5. The AND circuit 7 ANDs these signals and outputs the result of the ANDing as an ON/OFF signal for the transistor 10.

A driver 8 supplies the base of the transistor 9 with a signal processed on the basis of the ON/OFF signal for the transistor 9 output from the AND circuit 6 and also supplies the base of the transistor 10 with a signal processed on the basis of the ON/OFF signal for the transistor 10 output from the AND circuit 7.

FIG. 11 is a timing chart of various signals. The output of the delay circuit 4 is a signal which has a predetermined delay $\Delta T$ with respect to the output potential command. In consequence, the output of the AND circuit 6, that is, the ON/OFF signal for the transistor 9, rises when a predetermined period of time $\Delta T$ has elapsed after the rise of the output potential command. On the other hand, the output of the delay circuit 5 is a signal which has a predetermined delay $\Delta T$ with respect to the inverted output potential command. In consequence, the output of the AND circuit 7, that is, the ON/OFF signal for the transistor 10 rises when a predetermined period of time $\Delta T$ has elapsed after the fall of the output potential command. As a result, dead time $\Delta T$ can be provided between the ON signal for the transistor 9 and the ON signal for the transistor 10. This dead time is provided for the purpose of preventing the occurrence of a short across of the power supply due to a possible delay in operation of the transistors when turned OFF and is generally set at several tens of $\mu$sec. The operation of the conventional inverter controller involving such dead time is shown in FIGS. 12 and 13. Referring first to FIG. 12, an ON signal is supplied to the transistor 9 in the mode a, and current is flowing into the load 13 through the transistor 9. When, in this state, an OFF signal is supplied to the transistor 9 (the mode b), the current flowing through the transistor 9 decreases, and the current flowing through the diode 12 gradually increases. In this state, the transistor 9 has not yet been completely turned OFF. Therefore, if an ON signal is supplied to the transistor 10 in this state, the power supply is shorted. For this reason, it is necessary to supply an ON signal to the transistor 10 after the elapse of time which is sufficient for the transistor 9 to turn OFF completely, as shown in the mode c. The period of time during the mode b provided when the operation mode is shifted from the mode a to the mode c is referred to as "dead time".

Dead time is also provided when the operation mode is shifted from the mode c in which the transistor 10 is ON to the mode a in which the transistor 9 is ON. More specifically, the mode d is provided between the modes c and a.

The inverter operates in the above-described modes a to d when the output current is positive. When the output current is negative also, dead time such as modes f and h shown in FIG. 13 is similarly provided.

The dead time is set such to be sufficiently longer than a possible delay in operation of the transistors in order to prevent the occurrence of a short across the power supply and ensure the safety. However, the dead time constitutes an error with respect to the output potential command and therefore leads to lowering in the degree of accuracy in the current control. In addition, since the rise of the ON signal is delayed with respect to the output potential command, the response and stability are deteriorated.

To reduce the losses and noise in the load due to harmonic components, it is necessary to increase the switching frequency of the inverter so that the current ripple is reduced. However, since the above-described problems arise every switching operation of the inverter, such problems become even more conspicuous as the switching frequency becomes higher. Accordingly, the upper limit of switching frequency cannot be set at a high value, and the current ripple cannot be sufficiently reduced.

To solve the above-described problems, a method has already been tried in which the output voltage is fed back to detect an error portion in the output voltage due to the dead time, and the current control is corrected on the basis of this error portion (see, e.g., the specification of Japanese Patent Laid-Open No. 123478/1984).

This method suffers, however, from the following problems. Namely, the current control amplifier 18 shown in FIG. 10 needs to detect the error portion in the output voltage due to the dead time and carry out calculation for correcting the current control on the basis of the detected error. In addition, it is necessary to detect the output voltage at high speed and with a high degree of accuracy. Consequently, the current control method is complicated, and the controller for carrying out the method is costly. Further, since the switching operation of the inverter takes place with a delay corresponding to the dead time with respect to the output potential command at all times, the response and stability cannot be improved. This conventional method further involves a delay by the calculation of an error in the output voltage due to the dead time, and a delay by the calculation for correcting the error. It is therefore impossible to apply this method to the highly responsive current control in which the inverter is directly controlled by the instantaneous value of the current.

In order to overcome the above-described problems, another method has heretofore been tried in which the direction of the output current is fed back, and when the output current is positive, the supply of the ON signal to the transistor 10 is inhibited, whereas, when the output current is negative, the supply of the ON signal to the transistor 9 is inhibited, thereby carrying out current control without the need to provide dead time. This method, however, needs to feed back the direction of the output current, which means that the arrangement of the controller is complicated. The method is therefore disadvantageous from the economical point of view. In addition, when the detection system for detecting the direction of the output current is subjected to external disturbance such as noise, a serious accident, i.e., a short across the power supply may be caused, and this means that this method is unsatisfactory in terms of the reliability. When the output current is at or near the zero-crossing point, any drift of the detector leads to an erroneous detection of the direction of the output current, so that it becomes impossible to effect stable control of the inverter. For example, when the direction of the output current is positive and, therefore, the supply of the ON signal to the transistor 9 should be allowed, if the direction of the output current is errorneously recognized to be negative due to a drift of the detector and the supply of the ON signal to the transistor 9 is consequently inhibited, it becomes impossible to increase the output current any more.

SUMMARY OF THE INVENTION

In view of the above-described circumstances, it is an object of the present invention to provide an inverter controller in which the supply of the ON signal to a switching element which need not operate is compulsorily inhibited by an inhibiting circuit on the basis of an output current command value, thereby eliminating the need to provide any dead time.

It is another object of the present invention to provide an inverter controller so designed that it is possible to increase the degree of accuracy in the current control at or near the zero-crossing point of the output current.

It is still another object of the present invention to provide an inverter controller which enables the inverter to perform a stable operation with respect to any kind of load.

To these ends, according to a first aspect of the present invention, there is provided an inverter controller for controlling the current flowing through the output terminal of an inverter having a series circuit formed by series-connecting electric valves each formed by connecting a semiconductor switching element and a diode in antiparallel with each other, the node of series connection between the electric valves being connected to the output terminal, and both ends of the series circuit of the electric valves being respectively connected to the positive and negative sides of a DC power supply, the controller comprising: command value calculating means for calculating an output current command value; a current control amplifier for calculating an ON/OFF signal on the basis of said output current command value, an inhibiting circuit for calculating (and outputting) an inhibiting signal to turn one switching element to OFF and any other switching element to ON/OFF on the basis of said output current command value; and ON/OFF signal calculating means for supplying an OFF signal to one switching element and an ON/OFF siganl to any other switching element on the basis of said inhibiting signal output from said inhibiting circuit and said ON/OFF signal output from said current control amplifier.

By virtue of the above-described arrangement of the present invention, when pulse-width modulation control is effected for controlling the output current of the inverter, an output potential command, that is, an ON/OFF signal for the switching elements, is calculated on the basis of the pulse-width modulation control, and the supply of the ON signal to a switching element which need not operate is inhibited in order to hold such switching element in the OFF state, while the ON/OFF signal is supplied to only a switching element which needs to operate, on the basis of an output current command value which is known in the inverter controller.

As described above, according to the present invention, the supply of the ON signal to a switching element which need not operate is compulsorily inhibited by an inhibiting circuit on the basis of an output current command value. Therefore, it becomes unnecessary to provide any dead time during the commutation of the inverter, so that the accuracy and response in the current control are improved. Since no calculation which causes a delay is needed, it is possible to apply the invention to the highly responsive current control in which the inverter is directly controlled by the instantaneous value of the current. In addition, since the switching frequency of the inverter can be increased, it is possible to effectively reduce the losses and noise in the load due to harmonic components. In realization of the present invention, feedback of voltage, current or the like is not effected, but only an output current command value which is known in the inverter controller is utilized. Therefore, the arrangement of the apparatus is simplified, and the production cost is reduced. Also the reliability and safety are improved.

According to a second aspect of the present invention, the inhibiting circuit comprises: means adapted to inhibit the supply of the ON signal to the switching element connected to the negative side of the DC power supply when the sign of the output current command value is positive; and means adapted to inhibit the supply of the ON signal to the switching element connected to the positive side of the DC power supply when the sign of the output current command vbalue is negative.

According to the present invention having the above-described arrangement, the supply of the ON signal to the switching elements is inhibited on the basis of the sign of the output current command value. Consequently, any output current which has a sign different from that of the output current command value does not flow theoretically. It is therefore possible to further increase the degree of accuracy in the current control at or near the zero-crossing point of the output current. Since any useless commutation is not performed at or near the zero-crossing point of the output current, the switching frequency of the switching elements is decreased, and this enables the losses and noise in the inverter to be reduced.

According to a third aspect of the present invention, the inhibiting circuit comprises: means adapted to inhibit the supply of the ON signal to the switching element connected to the negative side of the DC power supply when the output current command value exceeds a positive threshold value; and means adapted to inhibit the supply of the ON signal to the switching element connected to the positive side of the DC power supply when the output current command value is smaller than a negative threshold value.

It is possible, according to the present invention having the above-described arrangement, to provide a dead zone at and near the zero-crossing point of the output current where the respective signs of the output current command value and the output current are likely to differ from each other. In the case where the arrangement according to the aforementioned aspect of the present invention is applied to a multiphase inverter, e.g., a three-phase inverter, when the output current command value and the output current are going to shift, at or near the zero-crossing point of the output current, in directions in which their respective signs become different from each other, the actual output current remains at zero, and the function of the phase concerned therefore stops, which may result in a single-phase inverter operation. In a particular load condition, there is a fear of the current control oscillating to become unable to effect control. In contrast to this, according to the third aspect of the present invention, a dead zone can be provided at and near the zero-crossing point of the output current, and each of the terminals of the load is constantly connected to the power supply through a diode or the like. It is therefore possible to allow the inverter to perform a stable operation with respect to any kind of load.

BRIEF DESCRIPTION OF THE DRAWINGS

FIGS. 10 to 13 show in combination a conventional inverter controller, in which:

FIG. 10 is a circuit diagram of the conventional inverter controller;

FIG. 11 is a timing chart showing the operation of the conventional inverter controller;

FIG. 12 shows inverter operation modes carried out when the output current value is positive; and FIG. 13 shows inverter operation modes carried out when the output current value is negative.

DESCRIPTION OF THE PREFERRED EMBODIMENTS

Preferred embodiments of the present invention will be described hereinunder in detail with reference to the accompanying drawings.

Figure 1:
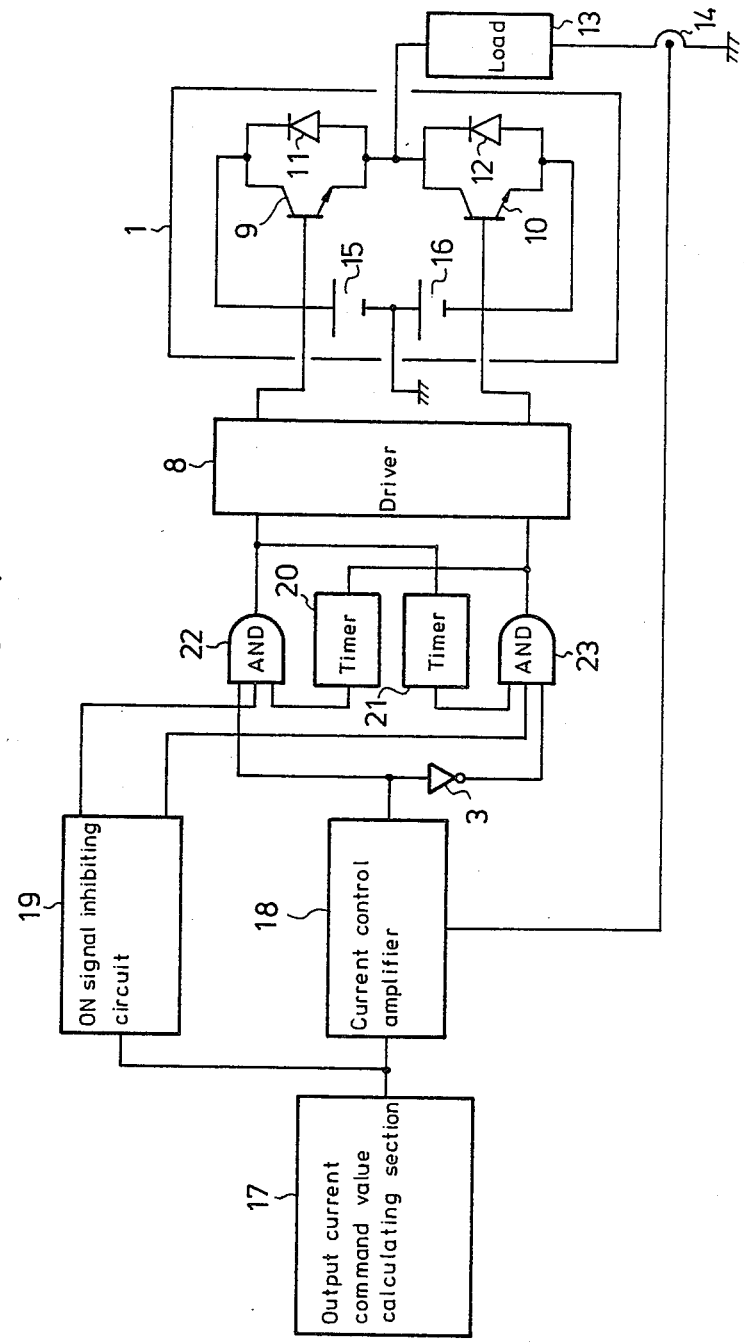
FIG. 1 is a circuit diagram of a first embodiment of the inverter controller according to the present invention.

FIG. 1 shows an inverter controller in accordance with a first embodiment of the present invention. A single-phase inverter is exemplified in this embodiment for simplification of the explanation.

This inverter is arranged using semiconductor elements in a manner similar to that in the prior art. More specifically, an anti-parallel circuit of a transistor 9 and a diode 11 and an anti-parallel circuit of a transistor 10 and a diode 12 are connected in series. One of the anti-parallel circuits is connected to the positive side of a DC power supply 15, and the other anti-parallel circuit is connected to the negative side of a DC power supply 16. One end of a single-phase load 13 is connected to an output terminal which is defined by the node of series connection between the transistors 9 and 10. The other end of the single-phase load 13 is grounded through a current detector 14. The node of series connection between the DC power supplies 15 and 16 is also grounded.

A current control amplifier 18, which constitutes an ON/OFF signal calculating means in accordance with the present invention, is supplied with, as inputs, an output current command value delivered from an output current command value calculating section 17 which serves as a command value calculating means and a detected output current value delivered from the current detector 14, so as to calculate and output an output potential command for the inverter, that is, an ON/OFF signal for the transistors 9 and 10. An ON signal inhibiting circuit 19, which constitutes an inibition means in accordance with the present invention, calculates a signal 1 and a signal 2 for cutting off the supply of the ON signals to the transistors 9 and 10, respectively, on the basis of the output current command value and outputs these signals 1 and 2 to AND circuits 22 and 23, respectively.

A timer 20 calculates a signal for inhibiting the supply of the ON signal to the transistor 9 for a predetermined period after the supply of the OFF signal to the transistor 10 has been started, and outputs this signal to the AND circuit 22. The timer 20 and one input portion of the AND circuit 22 in combination correspond to another inhibition means in accordance with the present invention. Similarly, a timer 21 calculates a signal for inhibiting the supply of the ON signal to the transistor 10 for a predetermined period after the supply of the OFF signal to the transistor 9 has been started, and outputs this signal to the AND circuit 23. The timer 21 and one input portion of the AND circuit 23 in combination correspond to still another inhibition means in accordance with the present invention.

The AND circuit 22 is supplied with, as one input, an output potential command from the current control amplifier 18 as an ON/OFF signal for the transistor 9. Another input to the AND circuit 22 is a signal 1 for cutting off the supply of the ON signal to the transistor 9 which is output from the ON signal inhibiting circuit 19 in accordance with the output current command value. The other input to the AND circuit 22 is a signal output from the timer 20 for inhibiting the supply of the ON signal to the transistor 9 for a predetermined period immediately after the transistor 10 has been turned OFF. The AND circuit 22 ANDs these input signals and outputs the result of the ANDing as a final ON/OFF signal for the transistor 9. On the other hand, the AND circuit 23 is supplied with, as one input, a signal, as an ON/OFF signal for the transistor 10, which is obtained by inverting the output potential command output from the current control amplifier 18 by means of a NOT circuit 3. Another input to the AND circuit 23 is a signal 2 for cutting off the supply of the ON signal to the transistor 10 which is output from the ON signal inhibiting circuit 19 in accordance with an output current command value. The other input to the AND circuit 23 is a signal output from the timer 21 for inhibiting the supply of the ON signal to the transistor 10 for a predetermined period immediately after the transistor 9 has been turned OFF. The AND circuit 23 ANDs these input signals and outputs the result of the ANDing as a final ON/OFF signal for the transistor 10.

The ON/OFF signal for the transistor 9, which is output from the AND circuit 22, is supplied to the base of the transistor 9 through a driver 8. Similarly, the ON/OFF signal for the transistor 10, which is output from the AND circuit 23, is supplied to the base of the transistor 10 through the driver 8.

Figure 2:
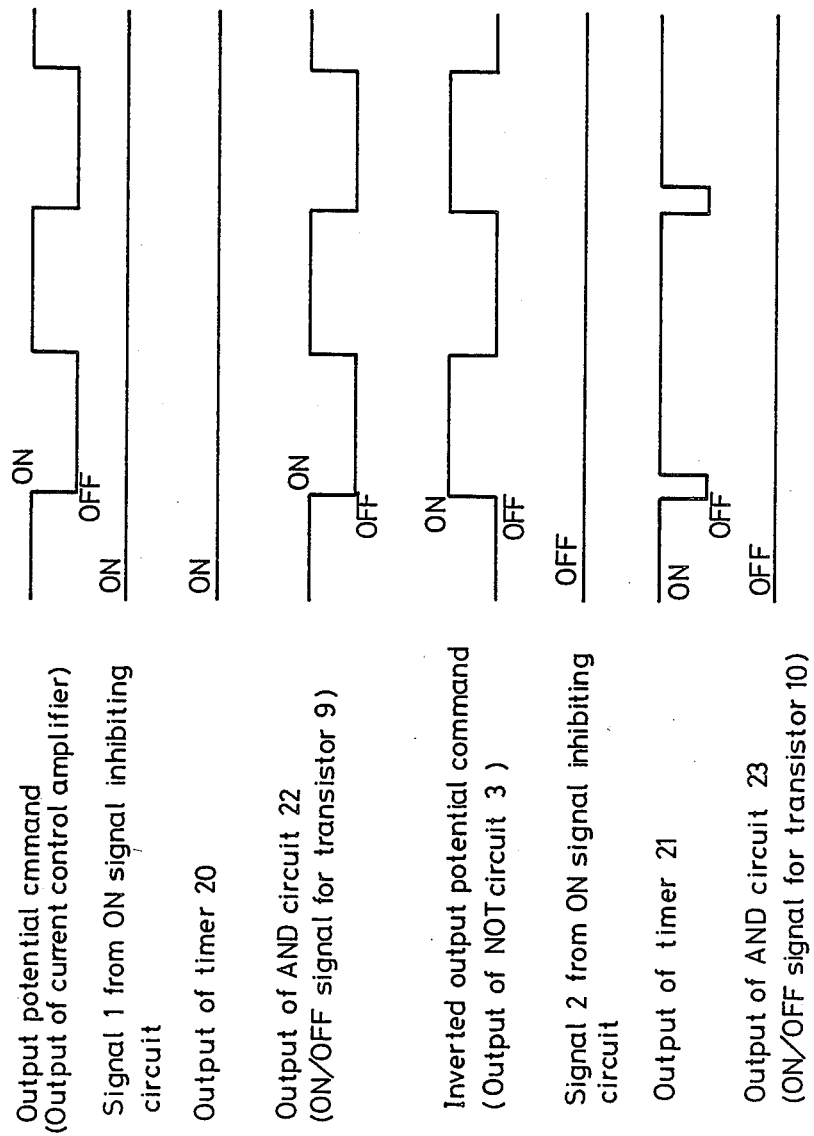
FIG. 2 is a timing chart showing the operation of the first embodiment carried out when the supply of the ON signal to the transistor 10 is inhibited by the ON signal inhibiting circuit 19.
Figure 3:
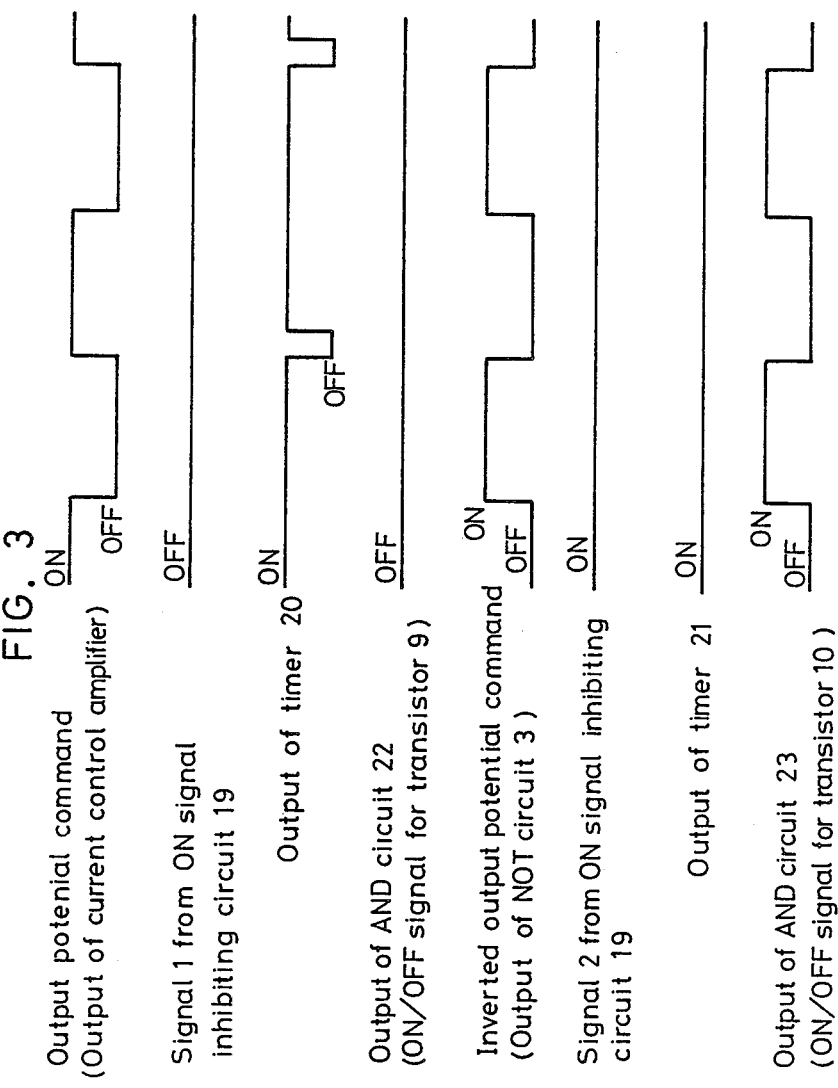
FIG. 3 is a timing chart showing the operation of the first embodiment carried out when the supply of the ON signal to the transistor 9 is inhibited by the ON signal inhibiting circuit 19.

The operation of the first embodiment will be explaind below. FIGS. 2 and 3 show time charts of various signals during the operation of the inverter when driven by the inverter controller in accordance with the first embodiment.

Referring first to FIG. 2, when the supply of the ON signal to the transistor 10 is cut off by the signal 2 output from the ON signal inhibiting circuit 19, a signal which is the same as the output potential command output from the current control amplifier 18 is supplied to the transistor 9.

Figure 4:
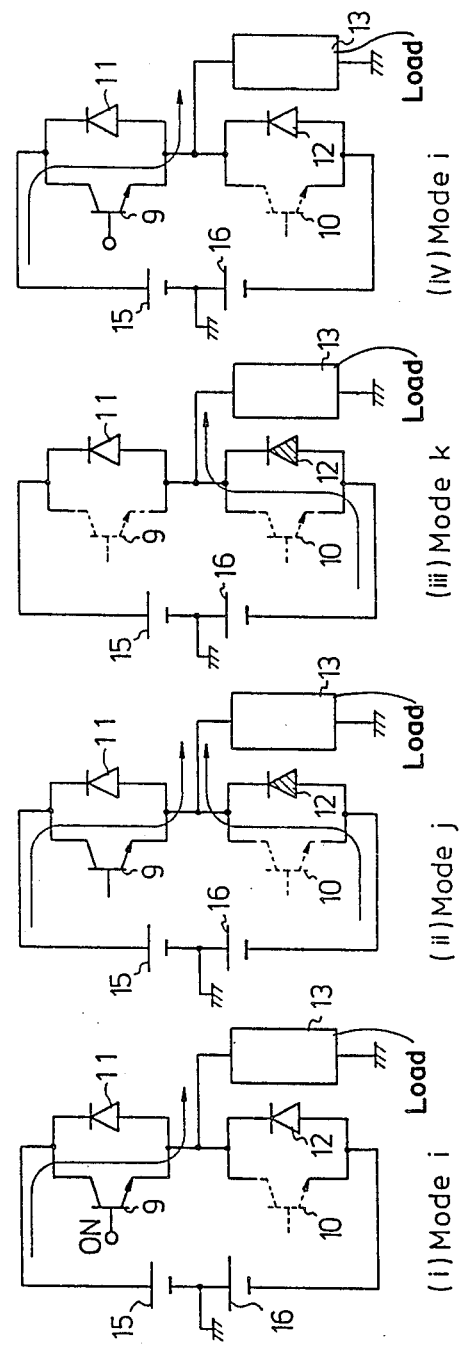
FIG. 4 shows inverter operation modes corresponding to the operation shown in FIG. 2.

The transistor 10 is, on the other hand, constantly supplied with an OFF signal in response to the signal 2. In consequence, when the above-described transistor drive signals are supplied to the inverter when current is flowing into the load 13 from the output terminal of the inverter, the inverter operates as shown in FIG. 4. This operation will be explained below.

In the mode i, the transistor 9 is supplied with the ON signal, and current is therefore flowing into the load 13 through the transistor 9. When, in this state, the OFF signal is supplied to the transistor 9 (the mode j), the current flowing through the transistor 9 decreases, and the current flowing through the diode 12 gradually increases. In the mode k, the transistor 9 has completely been turned OFF, and the current flows through the diode 12 alone. To return the operation mode to the mode i in this state, the ON signal can immediately be supplied to the transistor 9, since the transistor 10 is OFF.

Figure 12:
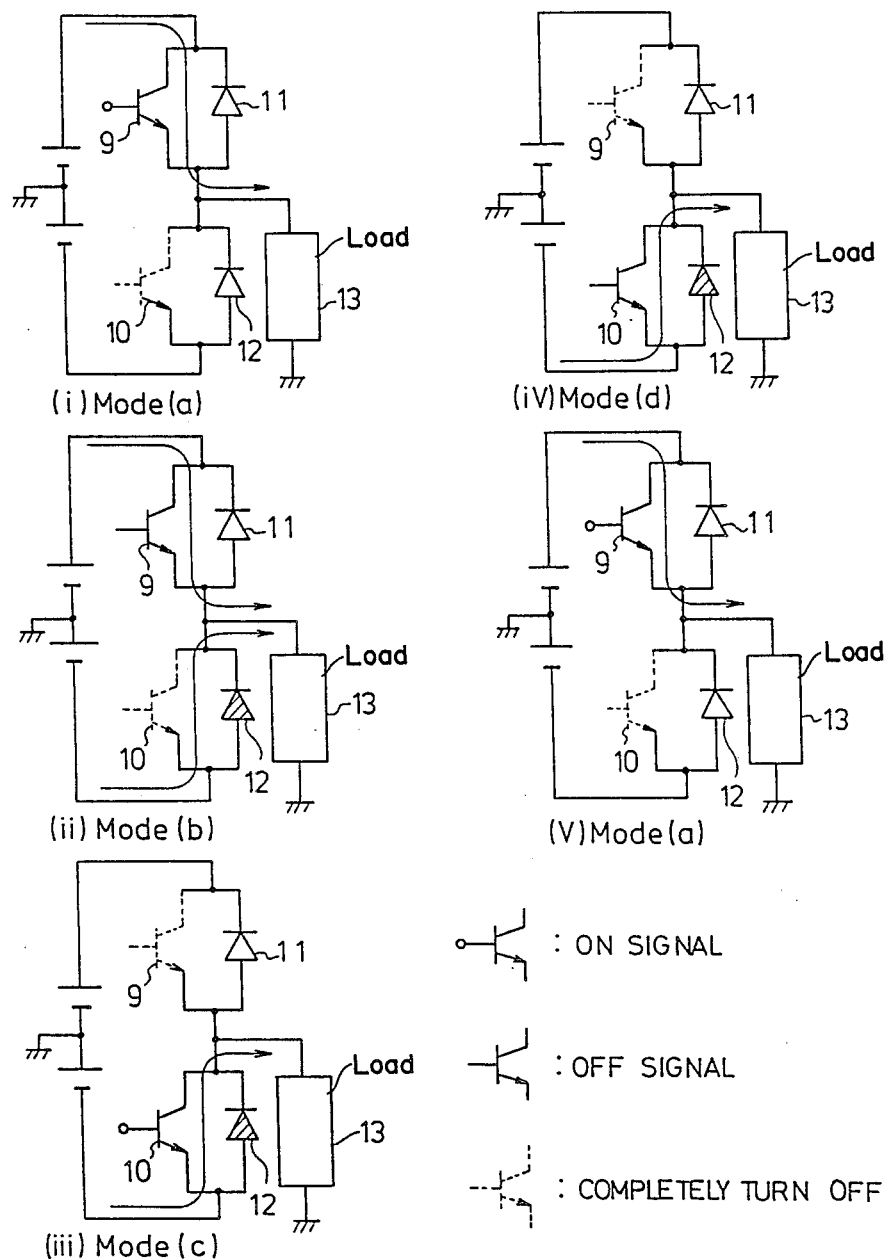

As will be understood from the above, in accordance with the first embodiment, the transistor 10 is OFF when current is being supplied to the load 13 from the inverter. Therefore, it becomes unnecessary to provide so-called dead time during the periods of the modes b and d shown in FIG. 12. In consequence, it is possible to effect switching of the inverter at the same timing as the output potential command output from the current control amplifier, so that the accuracy and response in the current control are improved.

It should be noted that, when current is flowing into the inverter in the above-described modes, the current flows through the diode 11 at all times to charge the DC power supply 15 and therefore decreases quickly.

Although the above description is about the operation of the first embodiment which takes place when the supply of the ON signal to the transistor 10 is cut off by the ON signal inhibiting circuit 19, a similar operation is carried out also when the supply of the ON signal to the transistor 9 is cut off. More specifically, as shown in FIG. 3, when the supply of the ON signal to the transistor 9 is cut off by the signal 1 output from the ON signal inhibiting circuit 19, the tansistor 10 is supplied with a signal which is the same as one which is obtained by inverting the output potential command. The trasistor 10 is, on the other hand, constantly supplied with an OFF signal in response to the signal 1. Accordingly, when the above-described transistor drive signals are supplied to the inverter when current is flowing into the inverter from the load 13, the inverter operates as shown in FIG. 5.

Figure 5:
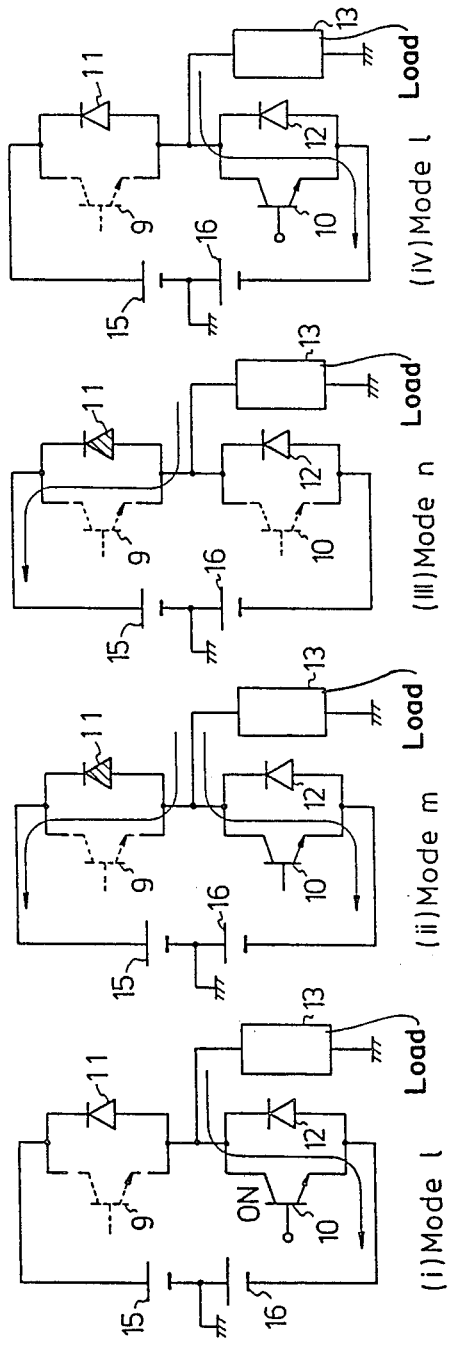
FIG. 5 shows inverter operation modes corresponding to the operation shown in FIG. 3.

In the mode l, as illustrated in FIG. 5, an ON signal is supplied to the transistor 10, and current is therefore flowing into the transistor 10 from the load 13. When, in this state, an OFF signal is supplied to the transistor 10 (the mode m), the current flowing through the transistor 10 decreases, and the current flowing through the diode 11 gradually increases. In the mode n, the transistor 10 has been completely turned OFF, and current flows through the diode 11 alone. To return the operation mode to the mode l from this state, an ON signal can immediately be supplied to the transistor 10, since the transistor 9 is OFF.

As will be clear from the above, in accordance with the first embodiment, the transistor 9 constantly remains OFF even when the current is flowing into the inverter from the load 13. Therefore, it becomes unnecessary to provide so-called dead time during the periods of the modes f and h shown in FIG. 13. Accordingly, it is possible to switch the inverter at the same timing as the output potential command output from the current control amplifier 18. It should be noted that, when current is flowing into the load 13 from the inverter in the above-described modes, the current flows through the diode 12 at all times to charge the DC power supply 16 and therefore decreases quickly.

As will be understood from the above description, the first embodiment eliminates the need to provide any dead time, and it is therefore possible to overcome the problems which have heretofore been caused by the dead time, such as the lowering of the degree of accuracy in the current control and the deterioration of the response.

In addition, since the first embodiment involves no dead time, the switching frequency can be increased as compared with the prior art, and load harmonic components can efficiently be decreased. Accordingly, it is possible to reduce the losses and noise caused by harmonic components. Since, in the first embodiment, an ON signal is supplied to a transistor which needs to operate actually, it is possible to minimize the base drive power for the transistors. Further, since an ON signal is supplied to only the transistor on one side, there is no fear of a short across the power supply even when the turn-off of the transistor on the other side delays by a large margin, so that the safety is greatly improved.

To inhibit the supply of the ON signal to a transistor which need not operate, only an output current command value which is known in the current control circuit is utilized without effecting feedback of the direction of the actual output current. Therefore, the arrangement of the apparatus is simplified, and the production cost can be reduced advantageously. Since no feedback is effected, even when the detection system of the apparatus is subjected to external disturbance such as noise, there is no fear of a short across the power supply, and there is also no fear of the operation being suspended by a drift in the detection system, whereas these problems have heretofore been experienced with the prior art.

It should be noted that, when the operation modes respectively shown in FIGS. 4 and 5 are changed over from one to the other, transistors which need to be supplied with an ON signal are switched over; therefore, it is necessary to prevent the occurrence of a short across the power supply only on the occasion where the supply of the ON signal to the tansistor 9 and that to the transistor 10 are temporally continuous with each other. For this reason, the timer 20 is provided and arranged to prevent an ON signal from being supplied to the transistor 9 unconditionally for at least a predetermined period after an OFF signal has been supplied to the transistor 10. Similarly, the timer 21 is provided and arranged to prevent an ON signal from being supplied to the transistor 10 unconditionally for at least a predetermined period after an OFF signal has been supplied to the transistor 9.

The following is a description of second and third embodiments of the present invention in which the ON signal inhibiting circuit 19 which constitutes an essential part of the inverter controller in accordance with the first embodiment is made even more practical.

Figure 6:
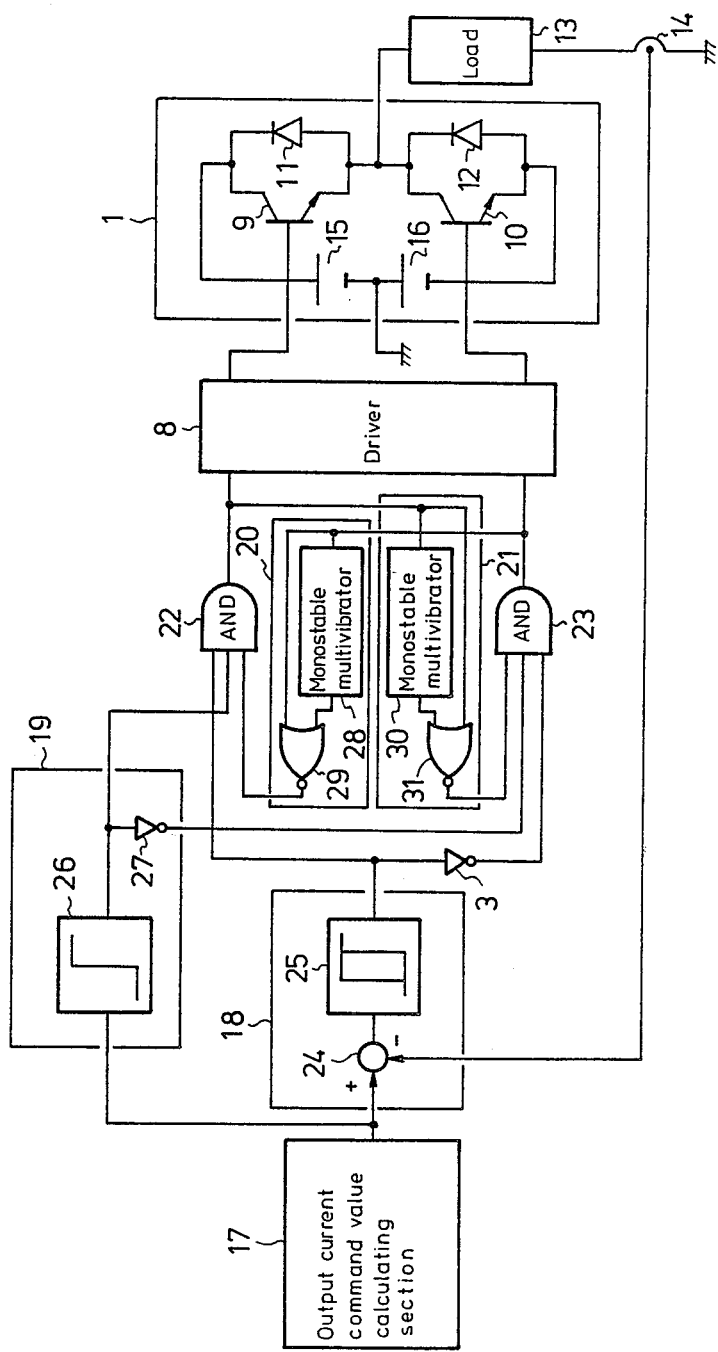
FIG. 6 is a circuit diagram of a second embodiment of the inverter controller according to the present invention.

FIG. 6 shows an inverter controller in accordance with the second embodiment which has an ON signal inhibiting circuit arranged so as to inhibit the supply of an ON signal to a switching element in accordance with the polarity of the sign of an output current command value. In FIG. 6, the constituent elements which have the same functions as those shown in FIG. 1 are denoted by the same reference numerals, and descripion thereof is omitted.

A current control amplifier 18, which constitutes an ON/OFF signal calculating means of the present invention, is composed of a comparator 24 and a hysteresis comparator 25. The comparator 24 is supplied with, as an input, an output current command value output from an output current command value calculating section 17 which constitutes a command value calculating means of the present invention. The comparator 24 is further supplied with, as another input, a detected output current value output from a current detector 14. Thus, the comparator 24 calcualtes a deviation of the detected output current value from the output current command value and outputs result of the calculation. The hysteresis comparator 25 is supplied with, as an input, the output current deviation signal output from the comparator 4. The comparator 25 subjects the deviation signal to a hysteresis comparison to obtain an output potential command for the inverter and outputs this command.

Accordingly, if the inverter is driven in accordance with this output potential command, the output current is controlled such as to fall in a predetermined hysteresis width range centering at the output current command value.

An ON signal inhibiting circuit 19 is composed of a comparator 26 and a NOT circuit 27. The comparator 26 is supplied with, as an input, an output current command value and compares the input with a predetermined value to obtain the sign of the output current command value, and outputs the obtained signal to an AND circuit 22 as a signal 1 for cutting off the supply of the ON signal to the transistor 9. The NOT circuit 27 inverts the output of the comparator 26 and outputs the inverted signal to an AND circuit 23 as a signal 2 for cutting off the supply of the ON signal to the transistor 10.

The ON signal inhibiting circuit 19, the NOT circuit 27 and one input portion of each of the AND circuits 22, 23 in combination correspond to an ON/OFF signal calculating means of the present invention.

A timer 20 is composed of a monostable multivibrator 28 and a NOR circuit 29. The monostable multivibrator 28 generates a pulse for a predetermined period from the rise of an ON/OFF signal for the transistor 10 which is output from the AND circuit 23. The NOR circuit 29 is supplied with, as inputs, an ON/OFF signal for the transistor 9 which is output from the AND circuit 23 and the output from the monostable multivibrator 28. The NOR circuit 29 NORs these signals and outputs the result of the NORing to the AND circuit 22.

Accordingly, the output from the NOR circuit 29 serves as a signal for inhibiting the supply of the ON signal to the transistor 9 when the ON signal is being supplied to the transistor 10 and for a predetermined period after the OFF signal has been supplied to the transistor 10.

The timer 20 and one input portion of the AND circuit 22 in combination correspond to another inhibition means of the present invention. A timer 21, a monostable multivibrator 30, a NOR circuit 31 and an AND circuit 23 are arranged similarly to the timer 20, the monostable multivibrator 28, the NOR circuit 29 and the AND circuit 22, respectively.

The timer 21 and one input portion of the AND circuit 23 in combination correspond to still another inhibition means of the present invention.

The operation of the above-described second embodiment will be explained below.

When the sign of the output current command value is positive, the signal 2 for inhibiting the supply of the ON signal to the transistor 10 is calculated and output as shown in FIG. 2, and the inverter is operated in the operation modes shown in FIG. 4. When the sign of the output current command value is negative, the signal 1 for inhibiting the supply of the ON signal to the transistor 9 is calculated and output as shown in FIG. 3, and the inverter is operated in the operation modes shown in FIG. 5. In this case, if the sign of the output current command value and the sign of the output current are different from each other, the output potential is different from the output potential command value. For instance, when the sign of the output current command value is positive, the inverter is controlled as shown in FIGS. 2 and 4. Therefore, if, in this state, the sign of the output current is negative, even when the transistor 9 is turned OFF, the current flows through the diode 11, and the output potential is coincident with the anode potential at all times.

However, since this is a regenerative state, the sign of the output current promptly changes from negative to positive, and the operation returns to normal. When the output current command value is positive and the output potential command is the cathode, no ON signal is supplied to the transistor 10 as shown in FIG. 4. Therefore, the output current does not decrease but remains at zero until the sign of the output current command value becomes negative.

Figure 7:
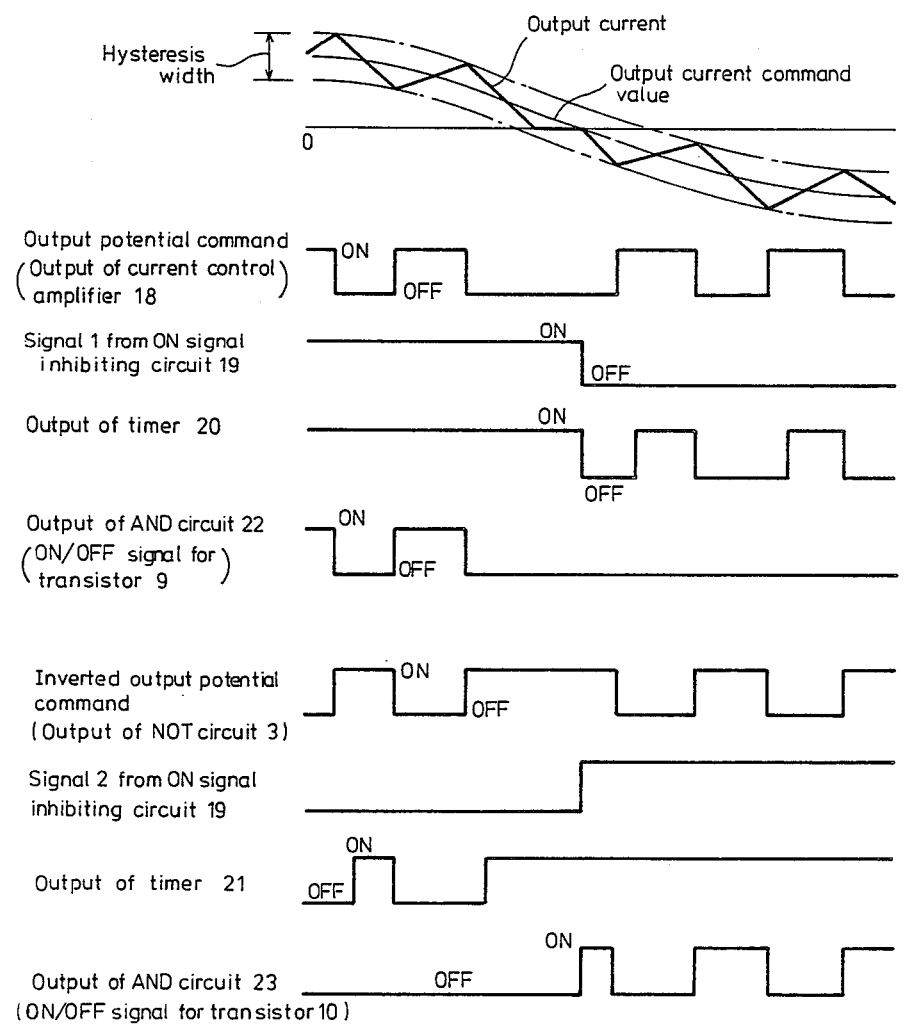
FIG. 7 shows the operation timing and output waveforms in the second embodiment.

FIG. 7 exemplarily shows waveforms at various portions during the operation of the inverter controlled by the inverter controller shown in FIG. 6.

As will be clear from FIG. 7, when both the output current command value and the actual output current value are positive, the inverter is operated in a manner completely similar to that shown in FIGS. 2 and 4, and advantages similar to those offered by the first embodiment are obtained.

When both the output current command value and the actual output current value are negative, the inverter is operated in a manner completely similar to that shown in FIGS. 3 and 5 and, in this case also, advantages similar to those offered by the first embodiment are obtained.

When the output current command value is positive and the output potential command value is negative, no ON signal is supplied to the transistor 10. Therefore, the output current does not become lower than zero but remains zero, as will be clear when looking at the vicinity of the zero-crossing point of the output current in the graph shown in FIG., 7.

As will be understood from the above, in accordance with the second embodiment, when the sign of the output current command value and the sign of the detected output current value are coincident with each other, advantages similar to those offered by the first embodiment are obtained. On the other hand, when the respective signs of the output current command value and the detected output current value are different or going to shift in directions in which they become different from each other, the output current is made zero immediately and left as it is, that is, at zero.

In other words, the control is effected such that the deviation of the actual output current value from the output current command value is decreased. Accordingly, in contrast to the conventional method in which the supply of the ON signal to a transistor which need not operate is inhibited by feeding back the direction of the acutal output current, the second embodiment advantageously enables useless switching operations to be eliminated and allows the current deviation to be reduced, so that the degree of accuracy in the current control is further increased. In particular, the second embodiment employs only the sign of an output current command value which is known in the current control circuit for inhibiting the supply of the ON signal to a transistor which need not operate, rather than effecting feedback of the direction of the actual output current. Therefore, the arrangement of the apparatus is simplified, and the production cost is also advantageously reduced. Since no feedback is carried out, even when the detection system is subjected to external disturbance such as noise, there is no fear of a short across the power supply, and any drift in the detection system will not suspend the operation, whereas these problems have heretofore been experienced with the prior art.

It should be noted that, since each of the timers in the second embodiment is composed only of a monostable multivibrator and a NOR circuit, the circuit configuration is simplified. According to such arrangement of the timers, the supply of the ON signal to one of the transistors is inhibited not only for a predetermined period after the other transistor has been turned OFF but also during a period when the other transistor is ON. Therefore, the safety is further improved as compared with the first embodiment.

In addition, since the current control amplifier in the second embodiment is composed only of a comprator and a hysteresis comparator, the circuit configuration is simplified, and it is further possible to effect the instantaneous value current control of high-speed response.

Figure 8:
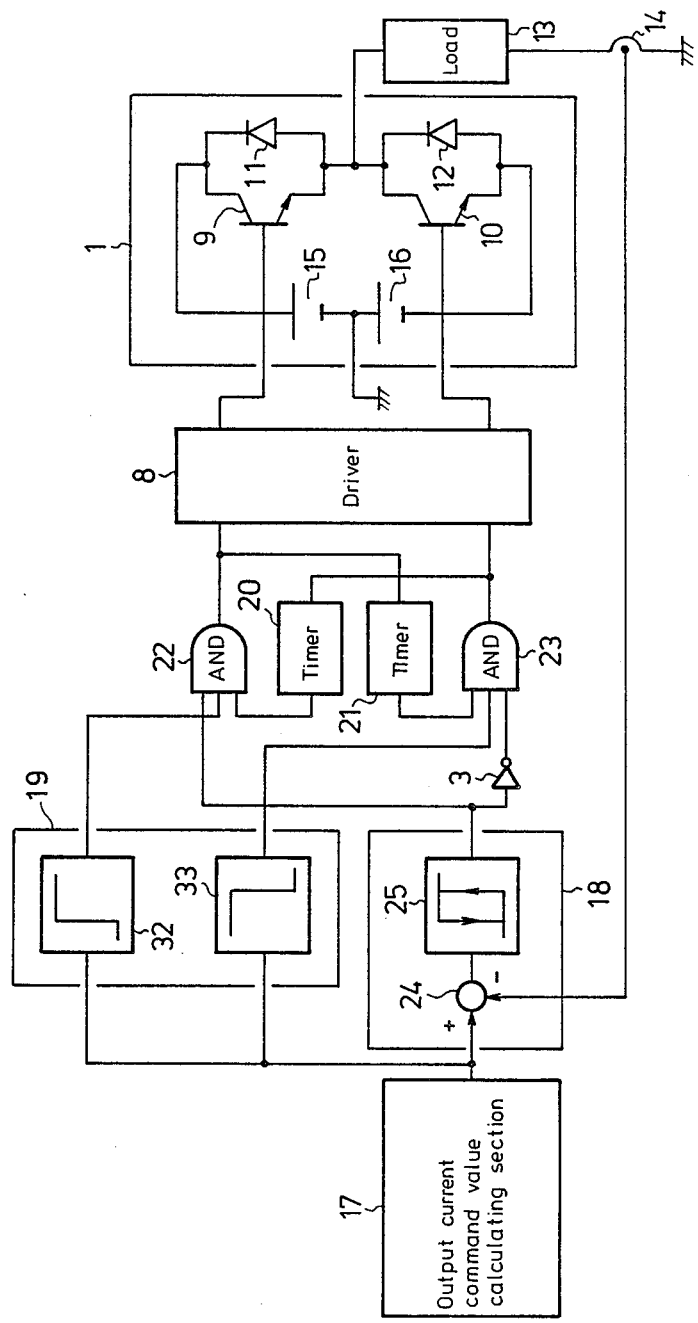
FIG. 8 is a circuit diagram of a third embodiment of the inverter controller according to the present invention.

Referring next to FIG. 8, there is shown a third embodiment of the inverter controller according to the present invention which has an ON signal inhibiting circuit arranged such as to inhibit the supply of the ON signal to a switching element when the output current command value exceeds a predetermined threshold value. In FIG. 8, the constituent elements having the same functions as those shown in FIGS. 1 and 6 are denoted by the same reference numerals, and descritpion thereof is omitted.

An ON signal inhibiting circuit 19 in this embodiment is composed of a comparator 32 with a negative offset and a comparator 33 with a positive offset and which delivers an inverted output.

The comparator 32 supplies a AND circuit 22 with its output as a signal 1 for cutting off the supply of the ON signal to the transistor 9. The comparator 33 supplies an AND circuit 23 with its output as a signal 2 for cutting off the supply of the ON signal to the transistor 10.

The ON signal inhibiting circuit 19 and one input portion of each of the AND circuits 22, 23 in combination correspond to an ON/OFF signal calculating means.

The operation of the third embodiment will be explained below.

When the output current command value exceeds a preset positive threshold value, the signal 2 for inhibiting the supply of the ON signal to the transistor 10 is calculated and output as shown in FIG. 2, and the inverter is operated in the operation modes shown in FIG. 4. When the output current command value is smaller than a preset negative threshold value, the signal 1 for inhibiting the supply of the ON signal to the transistor 9 is calculated and output as shown in FIG. 3, and the inverter is operated in the operation modes shown in FIG. 5. In this case, when the output current command value exceeds the positive threshold value or is smaller than the negative threshold value, the control in accordance with the present invention which involves no dead time is applied. When the output current command value is between the positive threshold value and the negative threshold value, neither of the inhibiting signals 1, 2 is output from the ON signal inhibiting circuit 19, and the inverter is therefore operated according to the conventional inverter controlling method.

Figure 9:
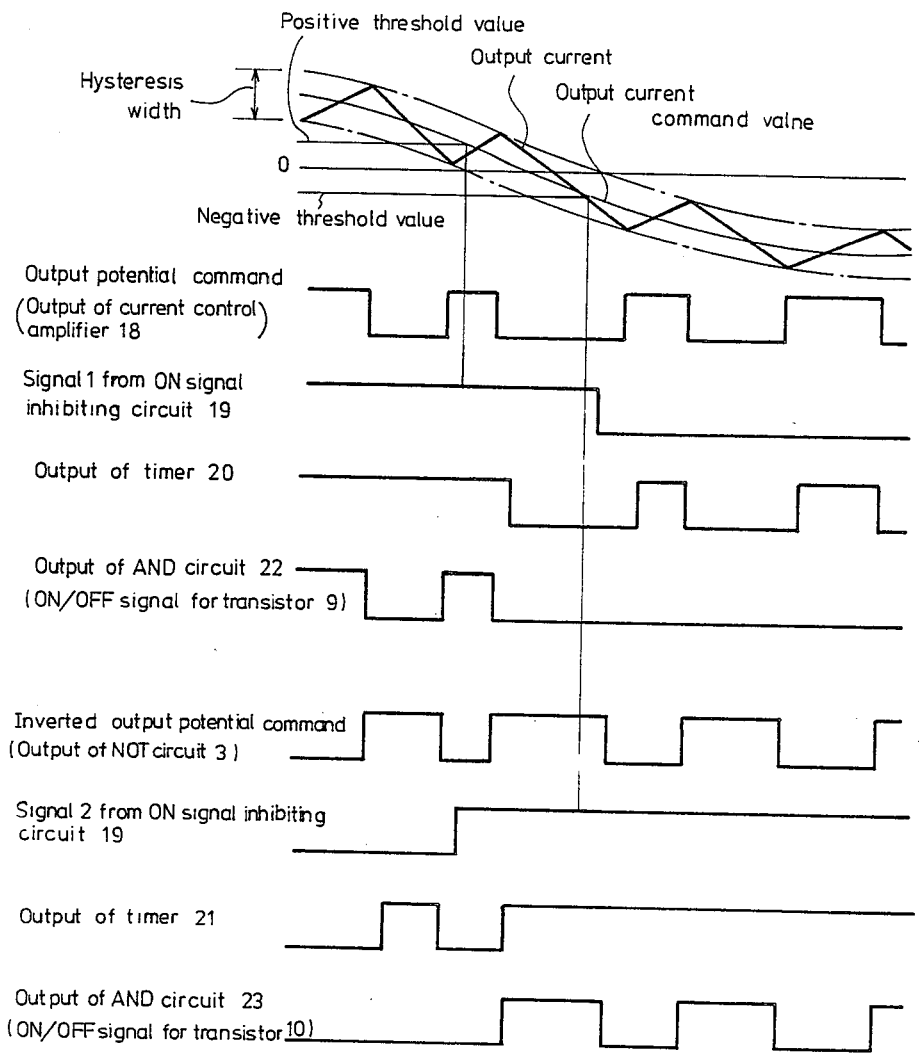
FIG. 9 shows the operation timing and output waveforms in the third embodiment.
Figure 10:
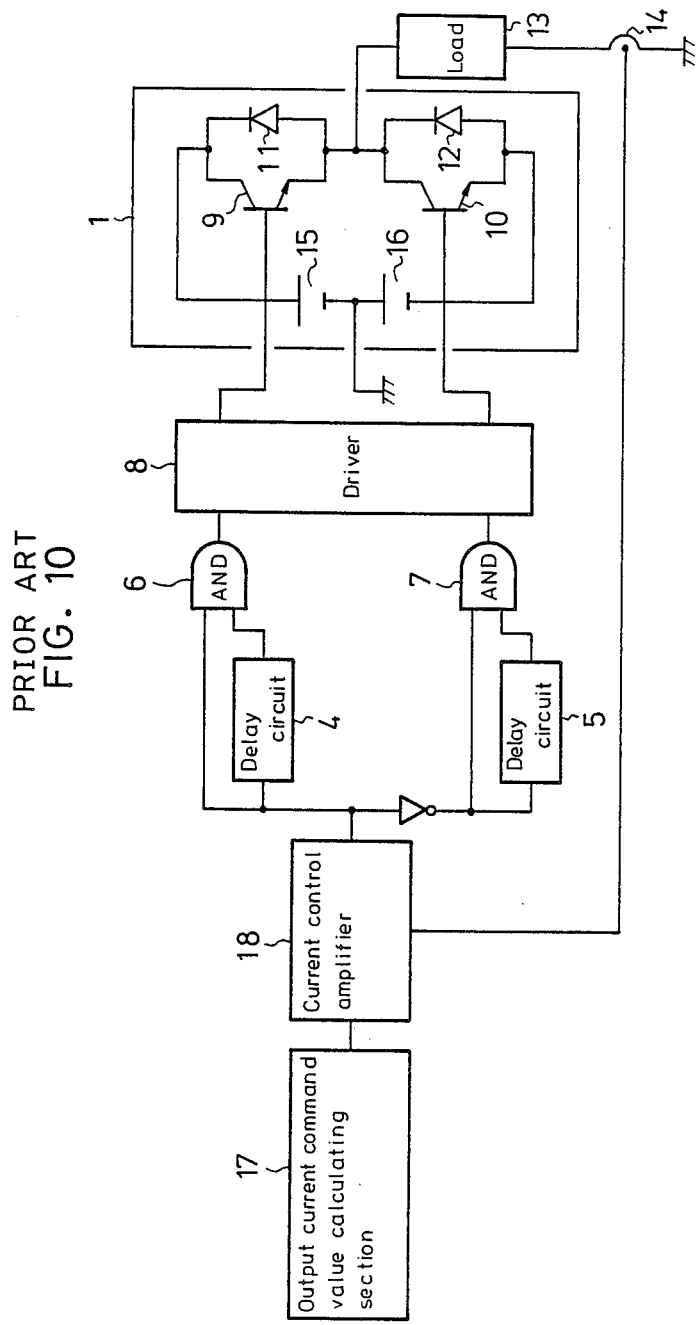
Figure 11:
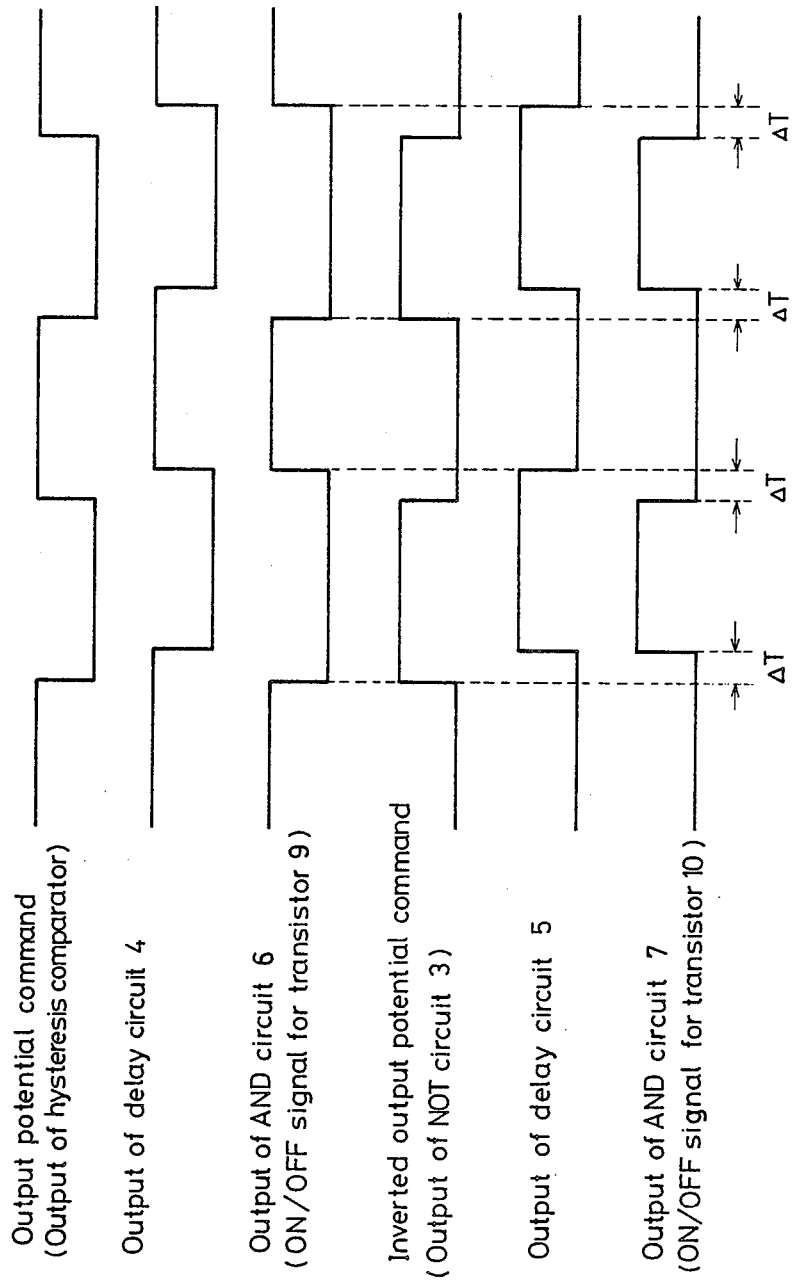

FIG. 9 exemplarily shows waveforms at various portions of the inverter when operated by the inverter controller shown in FIG. 8.

As will be clear from FIG. 9, when the output current command value is larger than the positive threshold value or smaller than the negative threshold value, the inverter is operated in the modes shown in FIGS. 2, 4 and those shown in FIGS. 3, 5, respectively. Thus, the above-described advantages of the present invention are obtained.

When the output current is at or near the zero-crossing point, the inverter is operated by the conventional control method in which dead time is provided. Therefore, the output current will not remain at zero as in the case of the second embodiment.

According to the third embodiment, therefore, it is possible to provide a dead zone in the vicinity of the zero-crossing point where the respective signs of the output current command value and the acual output current value are likely to differ from each other.

It should be noted that, when the second embodiment is applied to a multiphase inverter, e.g., a three-phase inverter, there are cases where the respective signs of the output current command value and the actual output current value differ from each other in the vicinity of the zero-crossing point of the output current, resulting in a single-phase inverter operation. In such case, the current control may oscillate in a particular load condition. However, since in the third embodiment a dead zone is provided and each of the terminals of the load is connected to the power supply at all times, the inverter can stably operate with respect to any kind of load.

In contrast to the conventional method in which the supply of the ON signal to a transistor which need not operate by feeding back the direction of the actual output current, the third embodiment utilizes only an output current command value which is known in the current control circuit to inhibit the supply of the ON signal to such transistor. Therefore, advantages similar to those offered by the second embodiment are obtained. Namely, the arrangement of the apparatus is simplified, and the production cost is also advantageously reduced.

Since no feed back is carried out as in the case of the second embodiment, even when the detection system is subjected to external disturbance such as noise, there is no fear of a short across the power supply, and any drift in the detection system will not suspend the operation.

It should be noted that, in the second and third embodiments, the inverter turns ON/OFF at the same timing as the output potential command at all times except when the output current is at or near the zero-crossing point. Accordingly, similar to the first embodiment, it is possible to overcome all the problems, such as the lowering of the degree of accuracy in the current control and the deterioration of the response, which have heretofore been experienced with the prior art in which dead time is provided.

Since the switching frequency of the inverter can be increased, the load harmonic components can efficiently be decreased. It is therefore possible to reduce the losses and noise which are caused by harmonic components.

Since the ON signal is supplied to only a transistor which needs to operate actually, it is possible to minimize the base drive power for the transistors.

In addition, since the ON signal is supplied only a transistor on one side, the safety is improved.

It should be noted that, since the ON signal inhibiting circuit in the third embodiment is composed of two comparators with an offset, the circuit configuration is simplified, and it is also possible to set negative and positive threshold values independetly of each other in accordance with the load.

The current control amplifier in the third embodiment is composed only of a comparator and a hysteresis comparator. Therefore, the circuit configuration is simplified as in the case of the second embodiment, and it is possible to apply the instantaneous value current control of high-speed response.

Although the inverter is formed from transistors in each of the above-described embodiments, the present invention may also be applied to inverters which are formed employing field-effect transistors (FET) or gate turnoff thyristors. Although a single-phase inverter is exemplified in the above-described embodiments, the present invention may similarly be applied to multiphase inverters.

In addition, the circuit, which constitutes the present invention, can be realized by means of software of a microcomputer.

Regarding the switching elements to be controlled, it is to be noted that when one switching element is OFF, the number of the switching element ON/OFF-controlled is at least one.

What is claimed is:

1. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:

command value calculating means for calculating an output current command value to obtain a desired current value through said load;

a current control amplifier for calculating an ON/OFF signal on the basis of said output current command value;

an inhibiting circuit for calculating an inhibiting signal to inhibit an ON signal to one switching element in order to keep said one switching element in the OFF state while any other switching element can repeat an ON or OFF state on the basis of the polarity of said output current command value; and ON/OFF signal calculating means for supplying an OFF signal to one switching element and an ON/OFF signal to any other switching element of the basis of said inhibiting signal output from said inhibiting circuit and said ON/OFF signal output from said current control amplifier.

2. An inverter controller according to claim 1, wherein said inhibiting circuit comprises a circuit for operating in such a manner that, when said output current command value is positive, said inhibiting circuit supplies said ON/OFF signal to the switching element constituting the electric valve connected to the positive side of said DC power supply and inhibits the supply of said ON siganl to the switching element constituting the electric valve connected to the negative side of said DC power supply, whereas, when said output current command value is negative, said inhibiting circuit supplies said ON/OFF siganl to the switching element constituting the electric valve connected to the negative side of said DC power supply and inhibits the supply of said ON signal to the switching element constituting the electric valve connected to the positive side of said DC power supply.

3. An inverter controller according to claim 2, wherein said ON/OFF signal calculating means comprises:
first timer circuit adapted to operate in such a manner that, when said output current command value changes from positive to negative, said first timer circuit inhibits the supply of the ON signal to the switching element constituting the electric valve connected to the negative side of said DC power supply for a predetermined period after the OFF signal has been supplied to the switching element constituting the electric valve connected to the positive side of said DC power supply, whereas, when said output current command value, changes from negative to positive, said first timer circuit inhibits the supply of the ON signal to the switching element constituting the electric value connected to the positive side of said DC power supply for a predetermined period after the OFF signal has been supplied to the switching element constituting the electric valve connected to the negative side of said DC power supply.

4. An inverter controller according to claim 1, wherein said inhibiting circuit comprises a circuit for operating in such a manner that, when said output current command value exceeds a negative threshold value, said inhibiting circuit supplies said ON/OFF signal to the switching element constituting the electric valve connected to the positive side of said DC power supply and inhibits the supply of said ON signal to the switching element constituting the electric valve connected to the negative side of said DC power supply, whereas, when said output current command value is smaller than a positive threshold value, said inhibiting circuit supplies said ON/OFF signal to the switching element constituting the electric valve connected to the negative side of said DC power supply and inhibits the supply of said ON signal to the switching element constituting the electric valve connected to the positive side of said DC power supply.

5. An inverter controller according to claim 1, wherein said ON/OFF signal calculating means comprises:
first timer circuit for inhibiting the supply of said ON signal to the switching element constituting the electric valve connected to the negative side of said DC power supply for a predetermined period after the OFF signal has been supplied to the switching element constituting the electric valve connected to the positive side of said DC power supply; and
second timer circuit for inhibiting the supply of said ON signal to the switching element constituting the electric valve connected to the positive side of said DC power supply for a predetermined period after the OFF signal has been supplied to the switching element constituting the electric valve connected to the negative side of said DC power supply.

6. An inverter controller according to claim 1, wherein, when an operation mode in which said inhibiting circuit supplies said ON/OFF signal to any switching element other than said specific switching element shifts to an operation mode in which said inhibiting circuit supplies said ON/OFF signal to said specific switching element and inhibits the supply of the ON signal to any switching element other than said specific switching element on the basis of said output current command value, said inhibiting circuit inhibits the supply of said ON signal to said specific switching element for a predetermined period after the OFF signal has been supplied to any switching element other than said specific switching element.

7. An inverter controller according to claim 1, wherein said inhibiting circuit comprises a circuit for operating in such a manner that, when said output current command value exceeds a positive threshold value, said inhibiting circuit supplies said ON/OFF signal to the switching element constituting the electric valve connected to the positive side of said DC power supply and inhibits the supply of said ON signal to the switching element constituting the electric valve connected to the negative side of said DC power supply, whereas, when said output current command value is smaller than a negative threshold value, said inhibiting circuit supplies said ON/OFF siganl to the switching element constituting the electric valve connected to the negative side of said DC power supply and inhibits the supply of said ON signal to the switching element constituting the electric valve connected to the positive side of said DC power supply.

8. An inverter controller according to claim 7, wherein said inhibiting circuit inhibits the supply of the ON signal to all the switching elements when said output current command value is between the positive threshold value and the negative threshold value.

9. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:
command value calculating means for calculating an output current command value to obtain a desired current value through said load;
detecting means for detecting an output current of said inverter;
a current control amplifier adapted to calculate a first ON/OFF signal for ON/OFF controlling said switching elements on the basis of said output current command value and said output current, and output said first ON/OFF signal;
an inhibiting circuit adapted to output a second ON/-OFF signal which becomes ON when said output current command value is positive and which becomes OFF when said output current command value is negative and to inhibit an ON signal to one switching element in order to keep said one switching element in the OFF state while any other switching element can repeat an ON or OFF state on the basis of the polarity of said output current command value;

a first AND gate for supplying the logical product of said first and second ON/OFF signals to the switching element constituting the electric valve connected to the positive side of said DC power supply; and a second AND gate for supplying the logical product of a signal obtained by inverting said first ON/OFF signal and a signal obtained by inverting said second ON/OFF signal to the switching element constituting the electric valve connected to the negative side of said DC power supply.

10. An inverter controller according to claim 9, wherein said current control amplifier calculates and outputs a first ON/OFF signal which becomes OFF when said output current rises and exceeds the upper limit of a predetermined range centering at said output current command value and which becomes ON when said output current lowers and becomes smaller than the lower limit of said predetermined range.

11. An inverter controller according to claim 9, wherein said current control amplifier comprises:
   a calculating circuit adapted to calculate a deviation of said output current from said output current command value and output a deviation signal; and
   a comparator with hysteresis which is supplied with said deviation signal as an input.

12. An inverter controller according to claim 9, further comprising:
   first timer circuit adapted to operate in such a manner that, when said output current command value changes from positive to negative, said first timer circuit inhibits the supply of the ON signal to the switching element constituting the electric valve connected to the negative side of said DC power supply for a predetermined period after the OFF signal has been supplied to the switching element constituting the electric valve connected to the positive side of said DC power supply, whereas, when said output current command value changes from negative to positive, said first timer circuit inhibits the supply of the ON signal to the switching element constituting the electric valve connected to the positive side of said DC power supply for a predetermined period after the OFF signal has been supplied to the switching element constituting the electric valve connected to the negative side of said DC power supply.

13. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:
   command value calculating means for calculating an output current command value to obtain a desired current value through said load;
   detecting means for detecting an output current of said inverter;
   a current control amplifier adapted to calculate a first ON/OFF signal for ON/OFF controlling said switching elements on the basis of said output current command value and said output current, and output said first ON/OFF signal;
   an inhibiting circuit adapted to output a first ON/OFF signal which becomes ON when said output current command value exceeds a positive threshold value and which becomes OFF when said output current command value is smaller than the positive threshold value, and a second signal which becomes ON when said output current command value is smaller than a negative threshold value and which becomes OFF when said output current command value exceeds the negative threshold value and to inhibit an ON signal to one switching element in order to keep said one switching element in the OFF state while any other switching element can repeat an ON or OFF state on the basis of the polarity of said output current command value;
   a first AND gate for supplying the logical product of said first and second ON/OFF signal and said first signal to the switching element constituting the electric valve connected to the positive side of said DC power supply; and
   a second AND gate for supplying the logical product of a signal obtained by inverting said first ON/OFF signal and said second signal to the switching element constituting the electric valve connected to the negative side of said DC power supply.

14. An inverter controller according to claim 13, wherein said current control amplifier calculates and outputs a first ON/OFF signal which becomes OFF when said output current rises and exceeds the upper limit of a predetermined range centering at said output current command value and which becomes ON when said output current lowers and becomes smaller than the lower limit of said predetermined range.

15. An inverter controller according to claim 13, wherein said current control amplifier comprises:
   a calculating circuit adapted to calculate a deviation of said output current from said output current command value and output a deviation signal; and
   a comparator with hysteresis which is supplied with said deviation signal as an input.

16. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:
   command value calculating means for calculating an output current command value to obtain a desired current value through said load;
   a current detector for detecting an output current of said inverter;
   a current control amplifier adapted to calculate a first ON/OFF signal for ON/OFF controlling said switching elements on the basis of said output current command value and said output current, and output said first ON/OFF signal;
   a NOT circuit adapted to invert and output said first ON/OFF signal;
   a signal inhibiting circuit adapted to output a first signal which becomes ON when said output current command is positive and which becomes OFF when said output current command is negative, and a second signal which becomes OFF when said output current command value is positive and which becomes ON when said output current command value is negative;

a first AND gate having three input terminals and connected in such a manner that said first ON/OFF signal and said first signal are respectively input to two of said input terminals;

a second AND gate having three input terminals and connected in such a manner that the output signal from said NOT circuit and said second signal are respectively input to two of said input terminals;

a first timer connected between the output terminal of said first AND gate and the remaining input terminal of said second AND gate and adapted to output an ON signal when a predetermined period of time has elapsed after an OFF signal has been output from said first AND gate;

a second timer connected between the output terminal of said second AND gate and the remaining input terminal of said first AND gate and adapted to output an ON signal when a predetermined period of time has elapsed after an OFF signal has been output from said second AND gate; and a driver adapted to supply the output signal from said first AND gate to the switching element constituting the electric valve connected to the positive side of said DC power supply, and the output signal from said second AND gate to the switching element constituting the electric valve connected to the negative side of said DC power supply.

17. An inverter controller according to claim 16, wherein said signal inhibiting circuit outputs a first signal which becomes ON when said output current command value exceeds a positive threshold value and which becomes OFF when said output current command value is smaller than the positive threshold value, and a second signal which becomes ON when said output current command value is smaller than a negative threshold value and which becomes OFF when said output current command value exceeds the negative threshold value.

18. An inverter controller according to claim 16, wherein said current control amplifier calculates and outputs a first ON/OFF signal which becomes OFF when said output current rises and exceeds the upper limit of a predetermined range centering at said output current command value and which becomes ON when said output current lowers and becomes smaller than the lower limit of said predetermined range.

19. An inverter controller according to claim 16, wherein said current control amplifier comprises:
a calculating circuit adapted to calculate a deviation of said output current from said output current command value and output a deviation signal; and
a comparator with hysteresis which is supplied with said deviation signal as an input.

20. An inverter controller according to claim 16, wherein said first timer comprises:
a monostable multivibrator connected at the input terminal thereof to the output terminal of said first AND gate; and
a NOR gate connected at one input terminal thereof to the output terminal of said monostable multivibrator and at the other input terminal thereof to the output terminal of said first AND gate, the output terminal of said NOR gate being connected to the remaining input terminal of said second AND gate.

21. An inverter controller according to claim 16, wherein said second timer comprises:
a monostable multivibrator connected at the input terminal thereof to the output terminal of said second AND gate; and
a NOR gate connected at one input terminal thereof to the output terminal of said monostable multivibrator and at the other input terminal thereof to the output terminal of said second AND gate, the output terminal of said NOR gate being connected to the remaining input terminal of said first AND gate.

22. An inverter controller according to claim 16, wherein said signal inhibiting circuit is constituted by a comparator adapted to make comparison between said output current command value and a predetermined value and output a signal representing the result of the comparison.

23. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:
command value calculating means for calculating an output current command value to obtain a desired current value through said load;
a current control amplifier for calculating an ON/OFF signal on the basis of said output current command value;
an inhibiting circuit for calculating an inhibiting signal to turn one switching element to OFF and any other switching element to ON/OFF on the basis of the polarity of said output current command value; and
ON/OFF signal calculating means for supplying an OFF signal to one switching element and an ON/OFF signal to any other switching element on the basis of said inhibiting signal output from said inhibiting circuit and said ON/OFF signal output from said current control amplifier, said ON/OFF signal calculating means comprising:
first inhibiting means for inhibiting the supply of said ON signal to the switching element constituting the electric valve connected to the negative side of said DC power supply for a predetermined period after the OFF signal has been supplied to the switching element constituting the electric valve connected to the positive side of said DC power supply; and
second inhibiting means for inhibiting the supply of said ON signal to the switching element constituting the electric valve connected to the positive side of said DC power supply for a predetermined period after the OFF signal has been supplied to the switching element constituting the electric valve connected to the negative side of said DC power supply.

24. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:

command value calculating means for calculating an output current command value to obtain a desired current value through said load;

a current control amplifier for calculating an ON/OFF signal on the basis of said output current command value;

an inhibiting circuit for calculating an inhibiting signal to turn one switching element to OFF and any other switching element to ON/OFF on the basis of said output current command value, said inhibiting circuit comprising a circuit for operating in such a manner that, when said output current command value exceeds a positive threshold value, said inhibiting circuit supplies said ON/OFF signal to the switching element constituting the electric valve connected to the positive side of said DC power supply and inhibits the supply of said ON signal to the switching element constituting the electric valve connected to the negative side of said DC power supply, whereas, when said output current command value is smaller than a negative threshold value, said inhibiting circuit supplies said ON/OFF signal to the switching element constituting the electric valve connnected to the negative side of said DC power supply and inhibits the supply of said ON signal to the switching element constituting the electric valve connected to the positive side of said DC power supply, and in such a manner that said inhibiting circuit inhibits the supply of the ON signal to all the switching elements when said output current command value is between the positive threshold value and the negative threshold value; and ON/OFF signal calculating means for supplying an OFF signal to one switching element and an ON/OFF signal to any other switching element on the basis of said inhibiting signal output from said inhibiting circuit and said ON/OFF signal output from said current control amplifier.

25. An inverter controller for controlling an inverter having a series circuit formed by series-connecting electric valves each formed by connecting a switching element and a diode in anti-parallel with each other, the node between said electric valves being connected to a load, one end of said series circuit being connected to the positive side of a DC power supply, and the other end of said series circuit being connected to the negative side of said DC power supply, comprising:

command value calculating means for calculating an output current command value to obtain a desired current value through said load;

a current control amplifier for calculating an ON/OFF signal on the basis of said output current command value;

an inhibiting circuit for calculating an inhibiting signal to turn one switching element to OFF and any other switching element to ON/OFF on the basis of the polarity of said output current command value such that, when an operation mode in which said inhibiting circuit supplies said ON/OFF signal to any switching element other than said specific switching element shifts to an operation mode in which said inhibiting circuit supplies said ON/OFF signal to said specific switching element and inhibits the supply of the ON signal to any switching element other than said specific switching element on the basis of said output current command value, said inhibiting circuit inhibits the supply of said ON signal to said specific switching element for a predetermined period after the OFF signal has been supplied to any switching element other than said specific switching element; and ON/OFF signal calculating means for supplying an OFF signal to one switching element and an ON/OFF signal to any other switching element of the basis of said inhibiting signal output from said inhibiting circuit and said ON/OFF signal output from said current control amplifier.

\* \* \* \* \*

UNITED STATES PATENT AND TRADEMARK OFFICE
CERTIFICATE OF CORRECTION

PATENT NO. : 4,739,465
DATED : April 19, 1988
INVENTOR(S) : K. ASANO et al.

It is certified that error appears in the above-identified patent and that said Letters Patent is hereby corrected as shown below:

Title page, section [75], change "Yukio Inagawa" to

-- Yukio Inaguma--.

Signed and Sealed this

Sixth Day of December, 1988

Attest:

DONALD J. QUIGG

*Attesting Officer*  *Commissioner of Patents and Trademarks*